(12) United States Patent
Yokomi (10) Patent No.: US 6,643,929 B2
(45) Date of Patent: Nov. 11, 2003

(54) METHOD OF PRODUCING BALL VALVE (75) Inventor: Masahiro Yokomi, Abiko (JP)

(73) Assignee: Tix Corporation, Tokyo (JP)

( * ) Notice: Subject to any disclaimer, the term of this patent is extended or adjusted under 35 U.S.C. 154(b) by 0 days.

(21) Appl. No.: 10/181,294

(22) PCT Filed: Nov. 16, 2001

(86) PCT No.: PCT/JP01/10052

§ 371 (c)(1),
(2), (4) Date: Jul. 16, 2002

(87) PCT Pub. No.: WO02/40905

PCT Pub. Date: May 23, 2002

(65) Prior Publication Data

US 2003/0106216 A1 Jun. 12, 2003

(30) Foreign Application Priority Data

Nov. 16, 2000 (JP) ......................... 2000-349386

(51) Int. Cl.⁷ ................................. B21K 1/20
(52) U.S. Cl. ............... 29/890.128; 29/890.129; 29/890.131; 29/469
(58) Field of Search ............ 29/890.131, 890.12, 29/890.124, 890.125, 890.126, 890.128, 890.129, 463, 469, 557; 251/286, 315.01, 315.1, 315.13, 315.16, 367, 366; 219/121.11, 136, 137 R; 228/161, 162

(56) References Cited

U.S. PATENT DOCUMENTS 3,157,190 A  * 11/1964 Allen .................. 137/330
3,241,808 A  * 3/1966 Allen .................. 251/174
3,460,802 A  * 8/1969 Colby et al. .......... 251/172
4,235,003 A   11/1980 Gachot

FOREIGN PATENT DOCUMENTS

| JP | 50-108024 | 2/1975 |
| JP | 55-14394 | 1/1980 |
| JP | 56-109956 | 8/1981 |
| JP | 58-50375 | 3/1983 |
| JP | 58-18168 | 12/1983 |
| JP | 6-341558 | 12/1994 |

* cited by examiner

Primary Examiner—Charles T. Jordan
Assistant Examiner—T. Nguyen
(74) Attorney, Agent, or Firm—Rader, Fishman & Grauer PLLC (57) ABSTRACT

A ball valve includes a valve housing 10 and a ball 20. A pair of mirror-symmetrical housing halves 12, 14 are jointed together along a single weld line to enclose the ball having a through bore and a pair of recessed portions. The through bore 22 is in conformity with the weld line. Holes 42, 50 for respectively mounting a pair of stem assemblies are formed in portions of the valve housing opposed respectively to opposite ends of the through bore. The through bore of the ball is brought into alignment with openings 12A, 14A of the valve housing, and the recessed portions 26, 28 of the ball are brought into alignment with the holes, respectively. Next, the pair of stem portions 60, 68 are attached to both holes and fitted into both recessed portions, and the stems are welded circumferentially to peripheral edge portions of the holes, respectively.

8 Claims, 4 Drawing Sheets

METHOD OF PRODUCING BALL VALVE

TECHNICAL FIELD

The present invention relates to a method of producing a ball valve to be connected to a fluid piping system, and more particularly to a method of assembling a housing, adapted to contain a ball therein, by welding.

BACKGROUND ART (1) U.S. Pat. No. 4,265,427 (corresponding to JP-A-55-14394) discloses one example ball valve which comprises, as main component members, a ball, and a housing containing the ball.

In the ball valve, a spherical shut-off member (i.e. a ball), contained in a hood (or a housing), has a pair of projections (or stems), and the projections are rotatably supported by a pair of support rings attached to an inner surface of the hood, respectively. The hood is assembled by welding a pair of hood halves together, and butt welding end faces of the pair of hood halves lie in a plane including an axis of rotation of the spherical shut-off member. Namely, the pair of hood halves are mirror-symmetrical with respect to the plane including the axis of rotation of the spherical shut-off member.

The hood has an operation hole (or window) provided for rotating the spherical shut-off member around the axis, and hemi-circular recesses, corresponding to the operation hole, are formed respectively in the pair of hood halves before the two hood halves are jointed together by welding.

The pair of support rings serve to receive a thrust force from a fluid, are provided respectively at opposed positions on the inner surface of the hood, and are disposed near to the axis of rotation of the spherical shut-off member in surrounding relation thereto, wherein one of the support rings surrounds the operation hole. Each of the two support rings comprises a combination of support ring halves corresponding respectively to the pair of hood halves, and the support ring halves are secured respectively on the inner surfaces of the pair of hood halves by welding prior to welding of the hood halves. Therefore, when the pair of hood halve are jointed together by welding, each pair of support ring halves are abutted against each other at their butting end faces to form the circular ring.

In order to prevent the inside of the hood from being affected by the welding operation (by which the pair of hood halves are jointed together), a partially cut off grooved ring is attached by welding on the inner surface adjacent to the welding face (i.e. the butt welding end face) of one of the hood halves. The grooved ring extends toward the mating hood half in the direction of the width thereof so as to extend circumferentially along the inner side of the butted end faces of the pair of hood halves for welding.

In the ball valve having such a structure, since the pair of support rings, which receive a thrust force from fluid, and the operation hole of the hood, are located close to the butt welded faces of the pair of hood halves, there is a possibility that thermal strain is induced in the hood due to welding heat resulting in a displacement of each support ring half from its proper position. In this case, the precision of the axis of rotation of the spherical shut-off member is affected, so that incomplete contact between valve seats, which are provided on the inner surface of the hood, and the spherical shut-off member occurs.

(2) U.S. Pat. No. 4,235,003 discloses a method of producing a ball valve. In the disclosed ball valve, a ball is contained in a hollow member (i.e. a housing), and the ball is rotatably supported by a pair of rings (i.e. valves seats). In the ball valve having such structure, unlike the ball valve disclosed in U.S. Pat. No. 4,265,427, the rings receive a thrust force from fluid.

The hollow member of the ball valve, disclosed in U.S. Pat. No. 4,235,003, is formed by jointing a pair of symmetrical pipe members together by welding. Each pipe member has a hemi-spherical enlarged portion (of a bowl-shape) formed at one end thereof, and open end faces of the two enlarged portions are butted and welded together at the end faces, thereby forming the hollow member. When the ball valve is opened or closed, the ball within the hollow member is operated by an operation stem passing through a hole formed in the hollow member, the hole being formed by a combination of hemi-circular recesses which are formed respectively in the open ends of the two enlarged portions prior to the welding for obtaining the hollow member. Here, the remaining portion of each pipe other than the enlarged portion will be referred to as a straight pipe portion, and a sleeve of a wedge-shaped cross-section for holding a ring (i.e. a valve seat) is fitted into each of the straight pipe portion, and is fixedly secured thereto by welding.

In the ball valve, although the straight pipe portions have an inner diameter corresponding to that in a fluid piping, there is a disadvantage that the sleeves and the rings (i.e. valve seats) narrow a fluid passage. Further, since the hemi-circular recesses are formed respectively in the enlarged portions of the two pipe members prior to welding for obtaining the hollow member, there is a possibility that the operating stem-passing hole, formed by the combination of the hemi-circular recesses, is affected by thermal strain which is induced in the hollow member by welding, so that the center of the hole is displaced out of a proper position.

Figure 5:
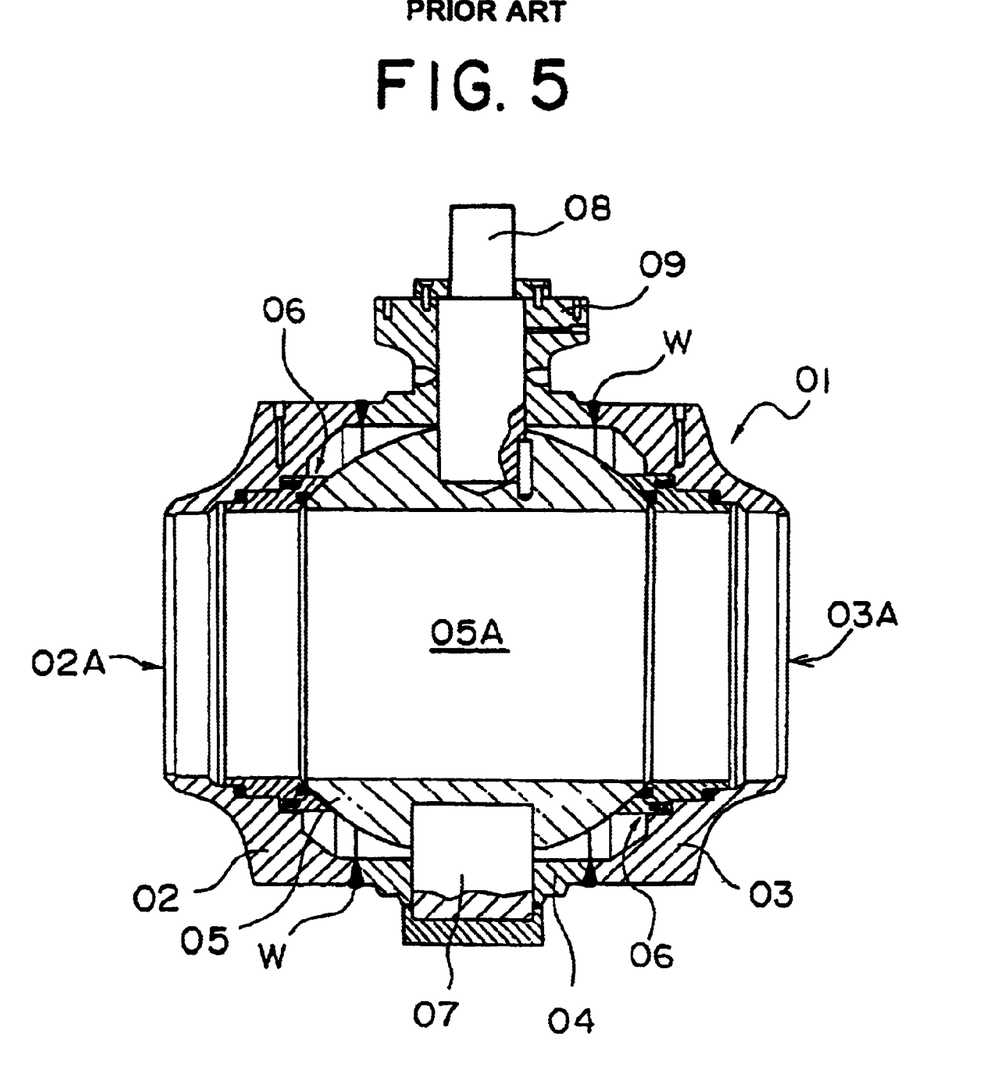
FIG. 5 is a cross-sectional view of a conventional ball valve.

(3) A third example of known ball valves is shown in FIG. 5. The ball valve comprises, as main components, a housing 01, having openings 02A and 03A formed respectively at opposite sides thereof, a ball 05, which is contained in the housing, and has a central through bore 05A, and a pair of stems 07 and 08 supporting the ball. The ball 05 is rotated by the operation stem 08 about the axis of the both stems. There are provided valve seat rings 06 and 06 between the housing 01 and the ball 05 which is kept always in contact with the valve seat rings 06 and 06.

The housing 01 consists of three members, that is, a first member 02, a second member 03 and a third member 04, the first and second members being mirror-symmetrical. The three members each having a generally tubular shape are butted and welded (W) at their open end faces.

The stems 07 and 08 extend through the third member 04. The stem 07 extends through the third member 04 and is fixed thereto. It is also rotatably fitted in a bore for stem of the ball 05. The other stem 08 is of an operation stem for rotating the ball valve, which rotatably extends through the third member 04, is supported by a separate support member 09, and is fitted in a bore for stem of the ball 05 so as not to rotate relatively to the ball.

This ball valve is of such a structure that the pair of stems 07 and 08 receive a thrust force from fluid. The housing 01 is assembled by jointing the three sectional members together by welding, which is disadvantageous from an economical point of view since the number of the components is large. Besides, since the two weld lines W, W are close to the valve seat rings 06 and 06, respectively, there will occur an unconformity with respect to the contact relationship between each of the valve seat rings 06, 06 and the ball 05 under the influence of thermal strain induced in the housing. Further, since the weld lines W, W are close to the stems 07 and 08, the shape of the respective holes of the third member 04 for the stems is affected by the thermal strain, whereby the precision of the stems 07 and 08, that is, the axis of rotation of the ball 05, is deteriorated, also resulting in an unconformity with respect to the contact relationship between each of the valve seat rings 06, 06 and the ball 05.

The present invention has been proposed under the above technical background.

Problems to be solved by the invention are to reduce the number of components, in producing a so-called trunnion type ball valve, in order to save the production cost for the trunnion type ball valve, such as the first conventional example of U.S. Pat. No. 4,265,427 and the third conventional example shown in the accompanying drawing of FIG. 5, and to eliminate adverse effects of thermal strain induced in a housing due to welding whereby obtaining the ball valve with a high precision.

DISCLOSURE OF THE INVENTION

According to the present invention, there is provided the following ball valve producing method:

a ball valve to be produced is connected to a fluid piping system, and comprises a valve housing (for example, a wall thickness=10 to 50 mm), and a ball rotatably contained in the valve housing. The valve housing and the ball are made, for example, of carbon steel or austenitic stainless steel (JIS SUS304).

The valve housing has a pair of holes, which are located in opposed positions so as to be connected respectively to pipes constituting the piping system, and a pair of stem assemblies which are located in opposed positions on a straight line perpendicularly intersecting another straight line, passing through centers of the pair of openings and a center of the ball, at the center of the ball.

The ball has a through bore, which can be brought into alignment with the pair of openings to allow the passage of a fluid therethrough, and a pair of recessed portions receiving the pair of stem assemblies, respectively. The ball is rotatable within the valve housing about a centerline passing through the pair of stem assemblies.

The ball valve having the above structure is produced by the following process:

(1) A pair of housing halves for forming the valve housing, and the ball having the through bore whose opposite open ends are formed to be flat, are prepared. The pair of housing halves are so formed to be mirror-symmetrical bodies of which forms are defined by sectioning the valve housing at the middle between the pair of openings. The ball is previously provided with a pair of recessed portions.

(2) Annular valve seats, each forming a seal between an outer surface of the ball and an inner surface of the valve housing, are mounted in the pair of housing halves, respectively.

(3) The pair of housing halves are butted at their open ends (opposite to the openings, respectively) so as to enclose the ball. At this time, the ball is kept in such a position that the ball is turned by an angle of 90 degrees from a normal operational position of the ball valve, while causing the center-line of the through bore to be in alignment with the operational axis of the ball and to perpendicularly intersect the straight line passing through the centers of the pair of openings and the center of the ball.

(4) The butted open ends of the pair of housing halves are jointed together by welding, thereby forming the valve housing.

(5) Without changing the position of the ball, holes for mounting the pair of stem assemblies respectively, are formed by machining at those positions of the valve housing faced respectively to the both flat open ends of the through bore of the ball. The both holes are so formed that the centers thereof are located on the operational centerline of the ball valve.

(6) The ball is turned by an angle of 90 degrees to be in the normal operational state of the ball valve such that the through bore is aligned with the both holes of the valve housing and that the recessed portions of the ball are aligned with the both holes of the housing, respectively. Next, the pair of stem assemblies are attached to the both holes, respectively, and stems are fitted into the both recessed portions, respectively, and subsequently the pair of stem assemblies are welded circumferentially to edge portions of the holes, respectively.

An embodiment of the invention method characterized by the above steps of the process will be described in the following:

(1) The welding at step (4) is effected by a TIG welding method (i.e. Tungsten inert-gas arc welding). In the TIG welding method, since no flux is used, spattering of slag will not occur during the welding operation, so that the contamination of the interior of the valve housing by foreign matters can be effectively prevented. Here, it should be noted that the entry of foreign matters, which would adversely affect the condition of contact of the ball with the valve seats, should be positively avoided.

(2) One of the pair of stem assemblies includes a non-operation stem, fitted in one of the two recessed portions, and an auxiliary member, and a base portion of the auxiliary member is welded circumferentially by welding to the peripheral edge of one of the holes. The other of the pair of stem assemblies includes a sleeve, fixedly secured to the valve housing, and a valve stem (i.e. valve-operating stem) rotatably fitted in the sleeve, with a seal ring interposed therebetween, and in a condition in which the valve stem is fitted in the sleeve, a distal end portion of the valve stem is fitted in the other recessed portion in a manner to prevent a relative rotation therebetween, and an end portion of the sleeve is jointed by welding to the peripheral edge of the hole over an entire periphery of the sleeve end portion.

(3) A flange plate is detachably fixed to a free end of the sleeve to prevent the valve stem from moving axially out of engagement with the sleeve, and a free end portion of the valve stem extends outwardly from the flange plate through an opening in the flange plate. This outwardly-extending portion is used as a valve-operation stem for rotating the ball about the centerline of the ball to open and close the ball valve.

(4) The pair of valve seats are mounted respectively on the inner surfaces of the housing halves in such a manner that the valve seats are located close to the pair of openings in parallel with end surfaces of the openings, respectively.

(5) Each of the pair of valve seats has a resilient member, and the valve seat is brought to close contact with the outer surface of the ball by a spring force of the resilient member.

(6) A body of the valve seat is a metal ring, and a resin ring is mounted on a peripheral edge of the metal ring, and the resin ring is brought to close contact with the outer surface of the ball.

(7) A body of the valve seat is a metal ring, and a rubber ring is mounted on a peripheral edge of the metal ring, and the rubber ring is brought to close contact with the outer surface of the ball.

BEST MODE FOR CARRYING OUT THE INVENTION

An embodiment of the present invention will now be described with reference to the drawings.

Figure 1:
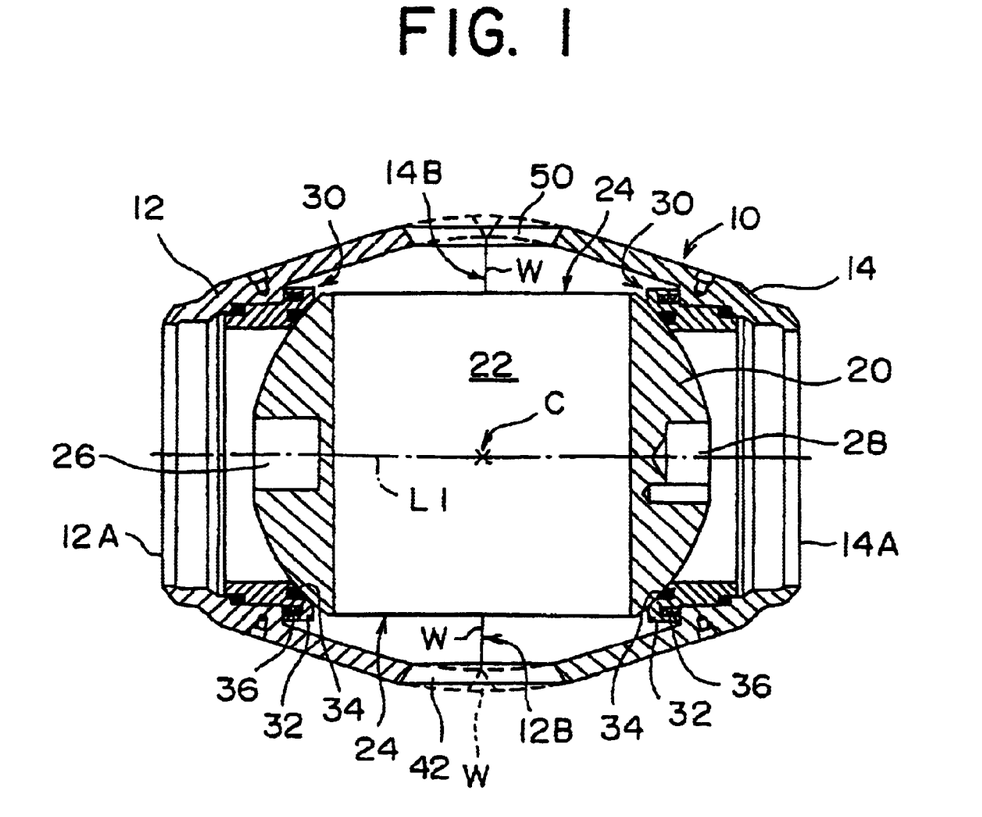
FIG. 1 is a cross-sectional view of a ball valve through an axis thereof, which is an intermediate product produced by the invention method.
Figure 2:
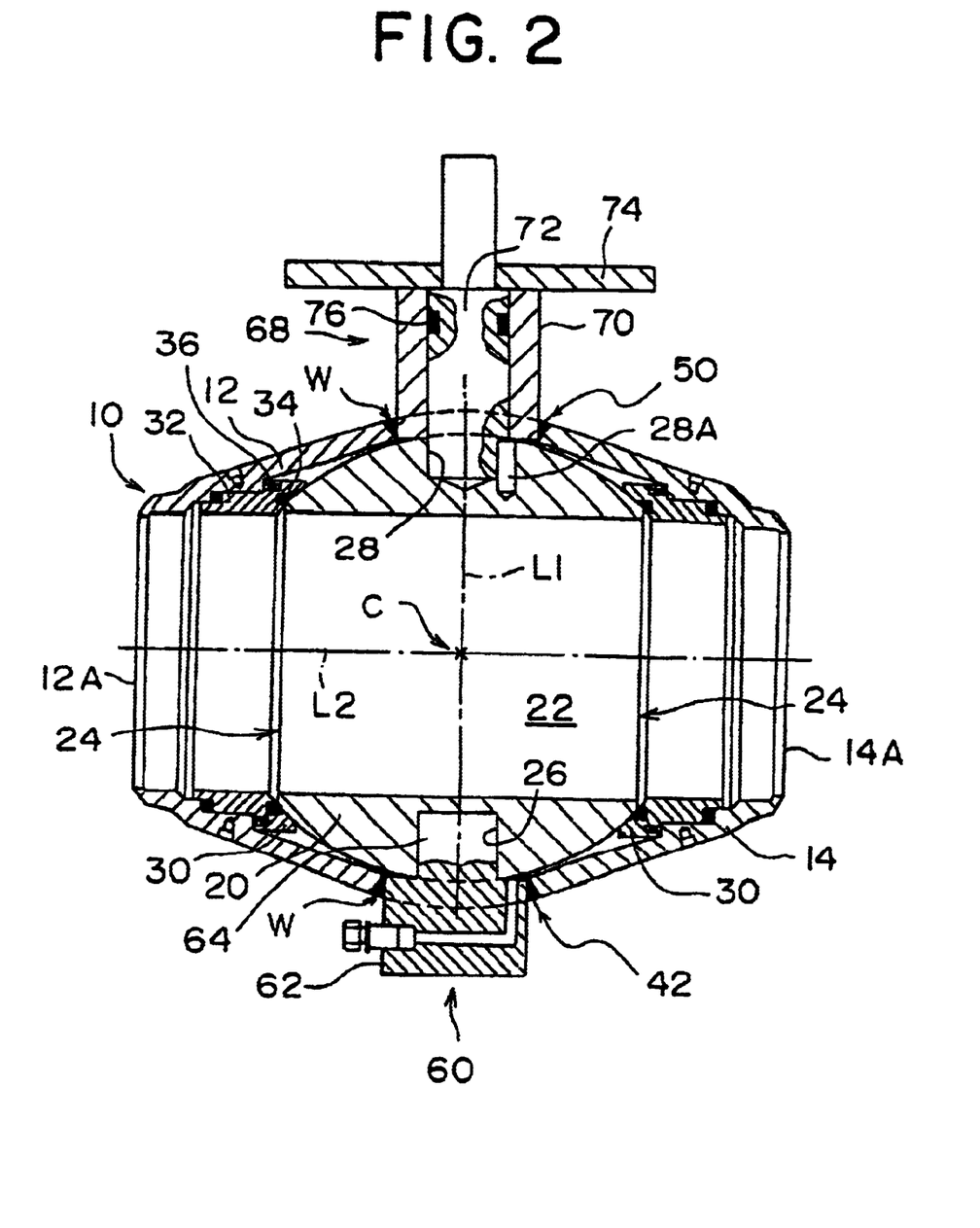
FIG. 2 is a cross-sectional view of the ball valve through the axis thereof, which is produced by the invention method.

FIG. 1 shows a cross-section of a ball valve (as an intermediate product) through an axis thereof. FIG. 2 is a cross-sectional view of the assembled ball valve.

First, the structure of the ball valve will be described. A ball 20 is rotatably contained within a valve housing 10 having a generally hollow cylindrical shape. The valve housing 10 has opposite open ends (openings 12A and 14A), and has a first hole 42 and a second hole 50 formed respectively through opposed portions of a central portion of the housing body (FIG. 1). The ball valve is connected to a piping system at the circular openings 12A and 14A of the valve housing 10. As shown in FIG. 2, a first stem portion 60 and a second stem portion 68 are fixedly secured respectively to the first hole 42 and the second hole 50 by welding.

Valve Housing

The body of the valve housing 10 has such a hollow cylindrical shape that the body is increasing in diameter from the circular openings 12A and 14A, formed respectively at the opposite ends thereof, toward a central portion thereof where the first hole 42 and the second hole 50, closed respectively by the first stem 60 and the second stem 50, exist.

Annular Valve Seats

A pair of annular valve seats 30 and 30 are provided on an inner surface of the valve housing 10 to form a seal between the valve housing 10 and the ball 20. The ball 20 can be rotated while kept in contact with the annular valve seats 30 and 30. The annular valve seat 30 comprises a metal ring 32, serving as a base portion, a plurality of compression coil springs 36 (preferably, ten compression coil springs), a sealing material ring 34 (For example, this is made of a resin material or a rubber material), mounted on a distal end of the metal ring 32 abutted against the ball 20, and an O-ring interposed between the metal ring 32 and the valve housing 10. The metal ring 32 and the sealing material ring 34 are pressed against a spherical outer surface of the ball 20 by the bias of the compression coil springs 36.

Ball

By removing portions of the ball 20, this ball is formed into such a configuration that parallel open ends 24 and 24 are formed respectively at opposite sides of the spherical body thereof, and the ball 20 has a central through bore 22, a first recessed portion 26 and a second recessed portion 28 all of which are cross-sectionally circular. A key groove is formed in the second recessed portion 28. The first recessed portion 26 and the second recessed portion 28 are formed respectively in opposite portions of the surface of the ball 20, and a straight line L1, passing through the centers of these recessed portions, perpendicularly intersects a centerline (that is, an axis) L2 of the central through bore 22 (FIG. 2). In the condition shown in FIG. 2, the centerline of the central through bore 22 is in alignment with the centerline of the valve housing 10, that is, a straight line (i.e. the axis) passing through the centers of the circular openings 12A and 14A.

Stem Portions

The first stem portion 60 includes a base portion 62 (auxiliary member), and a first stem 64 (non-operating stem) in the form of a round rod. The base portion 62 is fitted in the first hole 42 in the valve housing 10, and is welded and fixed to a peripheral edge of the first hole. The first stem 64 is fitted in the first recessed portion 26 of the ball 20.

The second stem portion 68 comprises a cylindrical sleeve 70, a valve-operating valve stem 72 (in the form of a round rod), fitted in this sleeve so as to rotate relative thereto, and a flange plate 74 secured to an outer end of the sleeve 70 by screws. One end portion of the sleeve 70 is fitted in the second hole 50 in the valve housing 10, and is welded and fixed to a peripheral edge of the second hole. The valve stem 72 projects from the one end of the sleeve 70, and is fitted in the second recessed portion 28 of the ball 20. A key 28A is engaged in key grooves, formed respectively in the valve stem 72 and the second recessed portion 28, thereby preventing a relative rotation between the two members 72 and 28. An O-ring 76 forms a seal between the valve stem 72 and the sleeve 70. That portion of the valve stem 72, extending outwardly from the sleeve 70, is smaller in diameter than its body portion fitted in the sleeve 70, and this smaller-diameter portion extends through an opening, formed through the flange plate 74, and a step portion, formed between the larger-diameter portion and smaller-diameter portion of the valve stem 72, is engaged with the flange plate 74, thereby preventing the movement of the valve stem 72 in the axial direction. The axes of the first stem 64 and the valve stem 72 lie on the straight line L1 (FIG. 2), and by rotating the smaller-diameter portion of the valve stem 72, the ball 20 can be rotated about the straight line L1 so as to open and close the ball valve.

Next, a method of producing the ball valve will be described.

(1) Preparation of Valve Housing Constituent Members (FIG. 1):

A pair of housing halves 12 and 14 for forming the valve housing 10 are prepared. The housing halves 12 and 14 are mirror-symmetrical with respect to a plane (reference plane) including the common axis of the first and second holes 42 and 50, formed in the valve housing 10, and the center C of the ball. The housing half 12 are open at its opposite ends, and has the opening 12A and a larger-diameter end 12B. Similarly, the housing half 14 has the opening 14A and a larger-diameter end 14B. The annular valve seats 30 are mounted in the housing halves 12 and 14, respectively. This mounting relation will be described with respect to the housing half 12, and a step portion is formed on that portion of the inner surface of the housing half 12, disposed near to the opening 12A of the housing half 12, in parallel relation to this opening 12A defining a flat opening lying in a plane, and the annular valve seat 30 is inserted into the housing half 12 through the larger-diameter end 12B, and is mounted on this step portion in fitted relation thereto. Similarly, the annular valve seat 30 is mounted on the housing half 14. As described above, each of the annular valve seats 30 and 30 serves to form a seal between the outer surface of the ball and the inner surface of the valve housing.

(2) Preparation of Ball (FIG. 1):

There is prepared the ball 20 which includes the central through bore 22 for allowing the flow of a fluid, and the opposite open ends 24 and 24 which are flat and parallel to each other. The first recessed portion 26 and the second recessed portion 28 are preformed in the ball 20 by machining. These recessed portions lie on the common axis.

(3) Combination of Housing Halves with Ball:

The housing halves 12 and 14 are butted at their open ends 12B and 14B (opposite with respect to the openings 12A and 14A, respectively) in a manner to enclose the ball 20. At this time, the ball 20 is kept in such a position that the direction of the ball 20 is turned by an angle of 90 degrees with respect to a normal ball valve operational condition, with the centerline of the through bore 22 coinciding with the centerline of the ball 20 (about which the ball is opened and closed), and perpendicularly intersecting the straight line passing through the centers of the openings 12A and 14A and the center of the ball 20.

(4) Welding:

The butted open ends (larger-diameter ends) 12B and 14B of the housing halves 12 and 14 are jointed together by welding (W), thereby forming the valve housing 10. This welding is effected by a TIG welding method. With this TIG welding, slag will not be scattered over the interior of the valve housing 10 during the welding, and this can serve to ensure the performance of the ball valve. In a preferred practical method, first to third layers of weld beads are formed by TIG welding, and subsequent bead layers are formed by an MIG welding method (Inert gas arc welding using a consumable electrode) or a submerged arc method.

(5) Formation of Holes:

While keeping the ball 20 in the position described in the above Item 3, the pair of holes (the first hole 42 and the second hole 50) for respectively mounting the stem portions 60 and 68 are formed by machining respectively in those portions of the valve housing opposed respectively to the flat open ends 24 and 24 of the through bore 22. At this time, the centers of the two holes to be formed lie on the operational centerline of the ball valve about which the ball is opened and closed.

Figure 3:
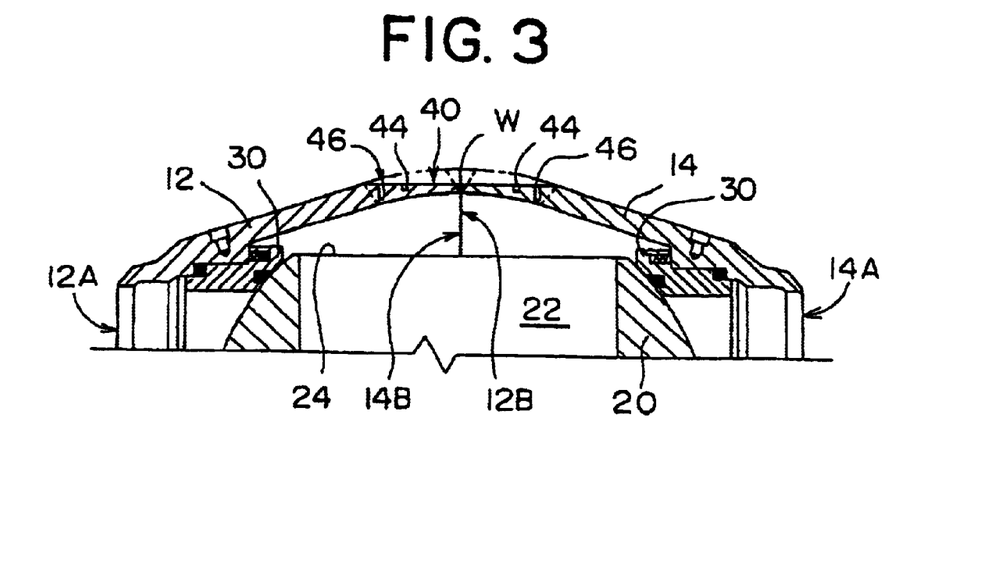
FIG. 3 is a cross-sectional view of a part of a valve housing, explanatory of a preparatory step for forming a hole of the valve housing after welding according to the invention method.
Figure 4:
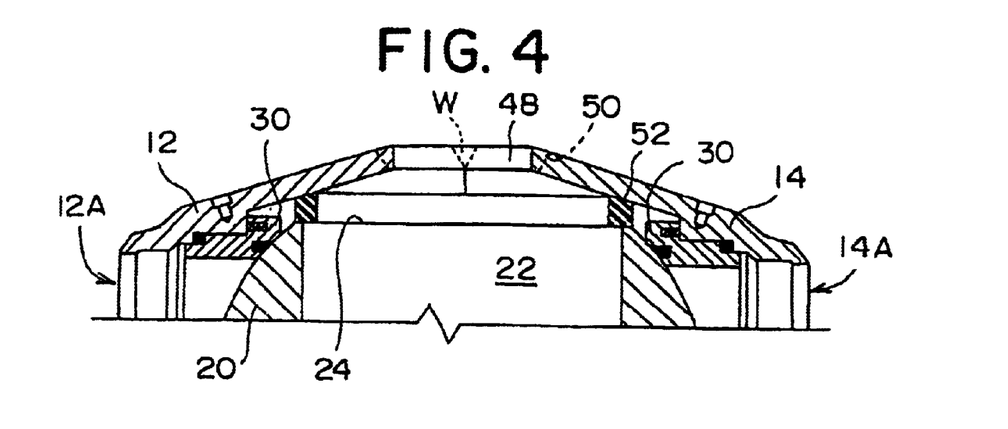
FIG. 4 is a cross-sectional view of a part of the valve housing, explanatory of a preparatory step subsequent to the step of forming a provisional hole in the valve housing after welding according to the invention method.

Specifically, the holes are formed according to the following procedure (see FIGS. 3 and 4).

FIG. 1 shows a condition in which the first hole 42 and the second hole 50 are already formed, but description will start from the condition in which the valve housing is as welded, and the holes are not yet formed. The two holes are formed by the same method, and therefore only the method of forming the first hole 42 will be described, and description of the method of forming the second hole 50 will be omitted.

a. That portion, corresponding to the first hole 42, is cut to be formed into a flat surface 40, as shown in FIG. 3.

b. Screw holes 44 and 44 are formed respectively in positions which are point-symmetrical with respect to the imaginary center of the first hole 42 disposed on the weld line W, and screws, each having a hook, are threaded into the screw holes 44 and 44, respectively.

c. An annular groove 46 is formed in surrounding relation to the screw holes 44 and 44, and is spaced outwardly from these screw holes. The depth of the annular groove 46 is slightly smaller than the wall thickness of the relevant portion, and the remaining wall thickness is a minimum dimension which can support the weight of a disk portion defined by the annular groove 46.

d. The disk portion, formed inside the annular groove 46, is pulled hard outwardly, using the pair of screws (each having the hook) threaded respectively in the screw holes 44 and 44, thereby rupturing the thin wall portion remaining at the bottom of the annular groove 46. As a result of this operation, a provisional hole 48 is formed (FIG. 4).

e. Utilizing the thus formed provisional hole 48, an annular foamed resin 52 is interposed between the open end 24 of the through bore of the ball 20 and the inner surface of the valve housing 10.

f. A peripheral edge portion of the provisional hole 48 is removed by cutting, thereby forming the first hole 42 (see broken lines in FIG. 4) of the predetermined size. At this time, because of existence of the annular foamed resin 52, cuttings, produced when cutting the peripheral edge portion of the provisional hole 48, will not enter spaces in which the spherical surface portions of the ball 20 are disposed, respectively. Incidentally, if the above steps a to e are effected for the second hole 50 before the peripheral edge portion of the provisional hole 48 is removed by cutting, the influence of the cuttings on the spherical surface portions of the ball 20 can be prevented more positively. After the peripheral edge portion of the provisional hole 48 is removed by cutting, the inner surface of the through bore 22 is cleaned, and the annular foamed resin 52 is removed.

(6) Welding of Stem Portions

After the operations of the above five Items are finished, the ball 20 is turned by an angle of 90 degrees, and is brought into the position shown in FIG. 2. In this ball position, the first stem portion 60 and the second stem portion 68 are disposed in alignment with the first hole 42 and the second hole 50, respectively.

a. First Stem portion 60: The base portion 62 and the first stem 64 are inserted into the first hole 42 and the first recessed portion 26, respectively. The base portion 62 is larger in diameter than the stem 64. The peripheral surface of the base portion 62 is jointed to the peripheral edge portion of the first hole 42 by TIG welding (W).

b. Second Stem portion 68: The valve stem 72 and the sleeve 70 are previously assembled together. The distal end portion of the valve stem 72, projecting from the sleeve 70, is inserted into the second recessed portion 28. At this time, the key 28A is engaged in the key groove, formed in the second recessed portion 28, and the key groove formed in the valve stem 72, to prevent the valve stem 72 from rotating in the second recessed portion 28. Subsequently, while the valve stem 72 is mounted in the second recessed portion 28, the outer surface of the sleeve 70 is jointed to the peripheral edge portion of the second hole 50 by TIG welding (W). By effecting the welding in the mounted condition of the valve stem 72, the alignment of the sleeve 70 at the time of the welding can be effected accurately.

When the welding of the stems is effected, the assemblage of the ball valve 10 is completed. Thereafter, pipes of the fluid piping system are connected respectively to the openings 12A and 14A of the ball valve 10.

Advantages of the present invention are as follows:

(1) In the present invention, the valve housing is formed by welding the pair of housing halves together, and the number of the component parts are smaller as compared with the conventional trunnion-type ball valve (shown in FIG. 5) in which the valve housing is formed by the three housing members. And besides, the welding portion, required for assembling the valve housing, is one, and therefore the production cost can be reduced.

(2) The weld line, formed at the time of assembling the valve housing, can be disposed at the central position of the valve housing sufficiently spaced from the valve seats, and therefore the influence of the welding heat on the valve seats is small, and this can contribute to the enhanced precision of the ball valve.

(3) The pair of holes for respectively mounting the stem assemblies are formed after the housing halves are jointed together by welding, and therefore in contrast with the case where the holes are previously formed, and therefore the holes are not subjected to the influence of thermal strain due to the welding, so that the axes of the stems can be set highly precisely.

(4) When forming the pair of holes after the valve housing is assembled by jointing the housing halves together by welding, the opposite open ends of the through bore of the ball (which is rotatable within the valve housing) are disposed in alignment with the pair of holes, respectively, and by doing so, the influence of cuttings, formed at the time of formation of the holes, on the spherical surface of the ball and the valve seats, can be prevented. And, after the holes are formed, the ball can be returned into the normally-used condition by rotating this ball by the angle of 90 degrees, and therefore this is convenient.

(5) In the ball valve formed in accordance with the present invention, the valve seats are previously mounted within the housing halves, respectively, and the ball is received, and the valve housing is assembled (by welding), and therefore in contrast with the ball valve, disclosed in U.S. Pat. No. 4,235,003 (in which the valve housing is assembled after putting a ball in the housing, thereafter the valve seats are inserted and fixed to the valve housing by welding), the through bore of the ball is sufficiently large, and can be formed into the same diameter as the diameter of the fluid inlet and outlet openings in the valve housing, and the ball valve will not offer a resistance to the flow of the fluid (that is, will not disturb a stream line of the fluid flow).

Capability of Exploitation in Industry

The method of the present invention can be applied to both small-size and large-size ball valves, and is suited particularly for the production of a large-size ball valve incorporated in a pipeline for petroleum or natural gas.

What is claimed is:

1. A method of producing a ball valve which is adapted to be connected to a fluid piping system, and comprises a valve housing, and a ball rotatably contained in the valve housing, wherein the valve housing has a pair of openings, which are located in opposed positions so as to be connected respectively to pipes constituting the piping system, and a pair of stem assemblies which are located in opposed positions on a straight line perpendicularly intersecting another straight line, passing through centers of the pair of openings and a center of the ball; and wherein the ball has a through bore, which can be brought into alignment with the pair of openings to allow the passage of a fluid therethrough, and a pair of recessed portions receiving the pair of stem assemblies, respectively, and the ball is rotatable within the valve housing about a centerline passing through the pair of stem assemblies, characterized in that:

a pair of housing halves for forming the valve housing, and the ball having the through bore whose opposite open ends are formed to be flat, are prepared, the pair of housing halves being so formed to be mirror-symmetrical bodies of which forms are defined by sectioning the valve housing at the middle between the pair of openings, and the ball being previously provided with a pair of recessed portions;

annular valve seats, each forming a seal between an outer surface of the ball and an inner surface of the valve housing, are mounted on the pair of housing halves, respectively;

the pair of housing halves are butted at their open ends, which are opposite to the openings, respectively, so as to enclose the ball, on the other hand, the ball is kept in such a position that the ball is turned by an angle of 90 degrees from a normal operational position of the ball valve, while causing the centerline of the through bore to be in alignment with an operational axis of the ball and to perpendicularly intersect the straight line passing through the centers of the pair of openings and the center of the ball;

the butted open ends of the pair of housing halves are jointed together by welding, thereby forming the valve housing;

subsequently, without changing the position of the ball, holes for mounting the pair of stem assemblies respectively, are formed by machining at those positions of the valve housing faced respectively to the both flat open ends of the through bore of the ball so that the centers thereof are located on the operational centerline of the ball valve; and the ball is turned by an angle of 90 degrees to be in the normal operational state of the ball valve such that the through bore is aligned with the both openings of the valve housing and that the recessed portions of the ball are aligned with the both holes of the housing, respectively, next, the pair of stem assemblies are attached to the both holes, respectively, and stems are fitted into the both recessed portions, respectively, and subsequently the pair of stem assemblies are welded circumferentially to edge portions of the holes, respectively.

2. A ball valve-producing method according to claim 1, wherein the step of jointing the open ends of the pair of housing halves together by welding is effected by a TIG welding method.

3. A ball valve-producing method according to claim 1, wherein one of the pair of stem assemblies has a non-operation stem, which is fitted in one of the recessed portions, and an auxiliary member, and a base portion of the auxiliary member is welded circumferentially by welding to the peripheral edge of one of the holes; and the other of the pair of stem assemblies includes a sleeve, which is fixedly secured to the valve housing, and a valve stem rotatably fitted in the sleeve, with a seal ring interposed therebetween, and a distal end portion of the valve stem is fitted in the other recessed portion so as not to relatively rotate while the valve stem is fitted in the sleeve, and an end portion of the sleeve is welded circumferentially to the peripheral edge of the hole.

4. A ball valve-producing method according to claim 1, wherein a flange plate is detachably fixed to a free end of the sleeve to prevent the valve stem from moving axially out of engagement with the sleeve, a free end portion of the valve stem extends outwardly from the flange plate through an opening of the flange plate, and the outwardly-extending portion is used as a valve-operation stem for rotating the ball about the operational centerline of the ball to open and close the ball valve.

5. A ball valve-producing method according to claim 1, wherein the pair of valve seats are mounted respectively on the inner surfaces of the housing halves in such a manner that the valve seats are located close to the pair of openings in parallel with end surfaces of the openings, respectively.

6. A ball valve-producing method according to claim 1, wherein each of the pair of valve seats has a resilient member, and the valve seat is brought to close contact with the outer surface of the ball by a spring force of the resilient member.

7. A ball valve-producing method according to claim 6, wherein a body of the valve seat is a metal ring, and a resin ring is mounted on a peripheral edge of the metal ring, and the resin ring is brought to close contact with the outer surface of the ball.

8. A ball valve-producing method according to claim 6, wherein a body of the valve seat is a metal ring, and a rubber ring is mounted on a peripheral edge of the metal ring, and the rubber ring is brought to close contact with the outer surface of the ball.

\* \* \* \* \*